(12) United States Patent
Bennett

(10) Patent No.: US 6,874,538 B2
(45) Date of Patent: Apr. 5, 2005

(54) FLUID DELIVERY SYSTEM

(76) Inventor: Kevin S. Bennett, 1189 Scott Blvd., Santa Clara, CA (US) 90025-1026

(*) Notice: Subject to any disclaimer, the term of this patent is extended or adjusted under 35 U.S.C. 154(b) by 0 days.

(21) Appl. No.: 10/805,100

(22) Filed: Mar. 19, 2004

(65) Prior Publication Data

US 2004/0187943 A1 Sep. 30, 2004

Related U.S. Application Data

(60) Provisional application No. 60/458,115, filed on Mar. 26, 2003.

(51) Int. Cl.[7] .............................................. F16K 27/00
(52) U.S. Cl. ...................................................... 137/884
(58) Field of Search ................................. 137/269, 270, 137/271, 884, 597

(56) References Cited

U.S. PATENT DOCUMENTS

| | | | |
|---|---|---|---|
| 5,964,481 A | | 10/1999 | Buch |
| 6,012,479 A | * | 1/2000 | Fukushima et al. ......... 137/271 |
| 6,039,360 A | * | 3/2000 | Ohmi et al. .................. 285/61 |
| 6,216,739 B1 | * | 4/2001 | Fukushima et al. ......... 137/884 |
| 6,273,139 B1 | | 8/2001 | Ohmi et al. |
| 6,283,155 B1 | | 9/2001 | Vu |
| 6,302,141 B1 | | 10/2001 | Markulee et al. |
| 6,394,138 B1 | | 5/2002 | Vu et al. |
| 6,502,601 B2 | * | 1/2003 | Eidsmore et al. ........... 137/884 |
| 6,546,961 B2 | * | 4/2003 | Fukushima .................. 137/884 |
| 6,629,546 B2 | * | 10/2003 | Eidsmore et al. ........... 137/884 |
| 2002/0000256 A1 | | 1/2002 | Eidsmore et al. |

* cited by examiner

Primary Examiner—John Fox
(74) Attorney, Agent, or Firm—Blakely, Sokoloff, Taylor & Zafman; Stephen M. De Klerk

(57) ABSTRACT

The invention provides a fluid delivery system, including a mounting structure, a plurality of rows of locator alignment components secured to the mounting structure, a plurality of rows of fluid connecting pieces, each having inlet and outlet ports and a fluid communication passage interconnecting the ports, the fluid connecting pieces being arranged in pairs, each pair including two of the fluid connecting pieces located next to one another in a respective row of fluid connecting components, the fluid connecting pieces of each pair being releasably held by and aligned relative to one another by a respective one of the locator alignment components, and a plurality of manifold pieces extending transverse to the rows of fluid connecting pieces, at least one manifold piece having a manifold passage with a center line crossing over a center line interconnecting the farthest ports of one of the pairs and being removable without removing the locator alignment component by which the respective pair is held from the mounting structure.

15 Claims, 5 Drawing Sheets

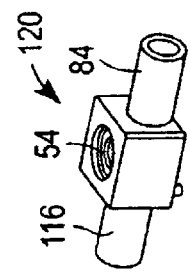
FIG. 10
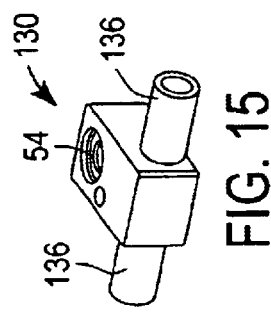
FIG. 6
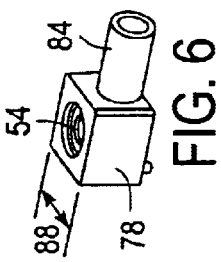
FIG. 11
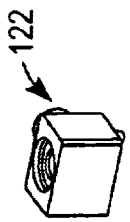
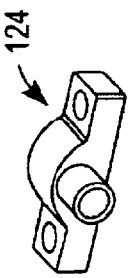
FIG. 12
FIG. 15
FIG. 13
FIG. 14
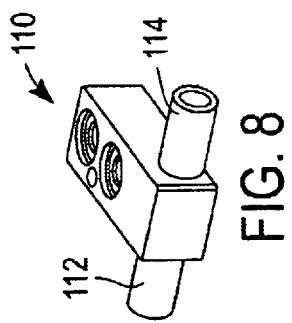
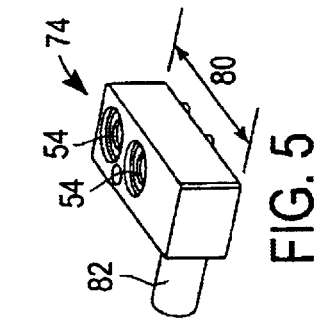
FIG. 8
FIG. 5
FIG. 9
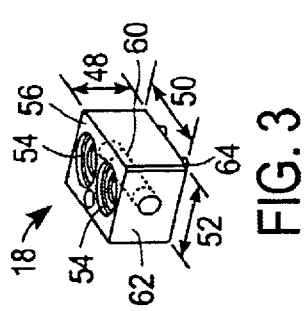
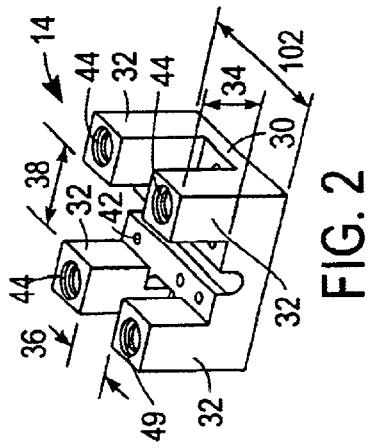
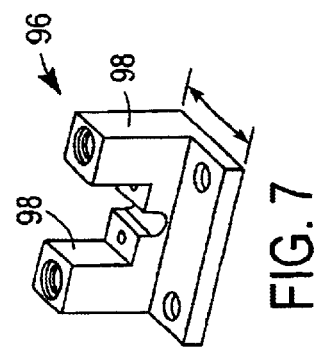
FIG. 3
FIG. 2
FIG. 7

FLUID DELIVERY SYSTEM

CROSS-REFERENCE TO RELATED APPLICATIONS

The present patent application claims priority from provisional patent application Ser. No. 60/458,115, filed on Mar. 26, 2003, which is incorporated herein by reference in its entirety.

BACKGROUND OF THE INVENTION

1). Field of the Invention

This invention relates to a fluid delivery system, or fluid delivery system, of the kind that may include interconnected fluid control components such as valves, regulators, mass flow controllers, filters, and pressure transducers.

2). Discussion of Related Art

Fluid delivery systems, also known as fluid delivery systems, are used in, for example, semiconductor processing systems to provide predetermined gases or mixtures of gases at predetermined flow rates and predetermined pressures into a processing chamber. Various supply gases are connected to inlets of such a manifold, and one or more outlets of the manifold are connected to the processing chamber. Such a manifold system usually includes components such as valves, regulators, mass flow controllers, filters, and pressure transducers that are connected to one another over a two-dimensional area in a manner that will ensure delivery of the desired gases or mixtures of gases at the desired flow rates and pressures to the processing chamber.

Fluid delivery systems are frequently in the form of smaller components that can be mounted to a base mounting structure in a modular fashion to create a desired flow pattern between fluid control components. It has been found that maintenance to such systems is usually extremely cumbersome because the replacement of a single piece may require disassembly and reassembly of a large number of pieces, and usually involves the breaking of a large number of seals that are expensive to replace.

SUMMARY OF THE INVENTION

The invention provides a fluid delivery system, including a mounting structure, a plurality of rows of locator alignment components secured to the mounting structure, a plurality of rows of fluid connecting pieces, each having inlet and outlet ports and a fluid communication passage interconnecting the ports, the fluid connecting pieces being arranged in pairs, each pair including two of the fluid connecting pieces located next to one another in a respective row of fluid connecting components, the fluid connecting pieces of each pair being releasably held by and aligned relative to one another by a respective one of the locator alignment components, and a plurality of manifold pieces extending transverse to the rows of fluid connecting pieces, at least one manifold piece having a manifold passage with a center line crossing over a center line interconnecting the farthest ports of one of the pairs and being removable without removing the locator alignment component by which the respective pair is held from the mounting structure.

The locator alignment components may be arranged in sets, each set including two of the locator alignment components next to one another in a respective row of locator alignment components, and each fluid connecting piece being held by both locator alignment components in a respective set.

A gap may be defined between fluid connecting pieces of a respective pair, the manifold piece being removable out of the gap without removal of the pair from the locator alignment component holding the pair.

The system may further include a plurality of locator alignment fasteners removably fastening the locator alignment pieces to the mounting structure.

The locator alignment components may, for example, be cradles. Each cradle may prevent movement of the fluid connecting pieces of a respective pair in x, y, and $\ominus$.

The system may further include a plurality of fluid control components placed in flow communication with one another through the fluid communication passages and the manifold passages.

One of the fluid control components may have an inlet passage connected to an outlet port of one of the connecting pieces of a pair, and an outlet passage connected to an inlet port of another one of the connecting pieces of the respective pair.

The fluid control components may include at least one of a valve, a regulator, a mass flow controller, a filter, and a pressure transducer.

The ports of each respective fluid connecting piece may be located into the same side of the respective fluid connecting piece.

The system may further include at least one fluid T-piece having at least three ports and at least one fluid communication passage interconnecting all three ports, the T-piece being releasably held and aligned relative to one of the locator alignment components, one of the ports of the fluid T-piece being connected to the manifold piece.

The system may further include at least one fluid elbow piece having at least two ports and at least one fluid communication passage interconnecting both ports, the elbow piece being releasably held and aligned relative to one of the locator alignment components, one of the ports of the fluid elbow piece being connected to the manifold piece.

A gap may be defined between the fluid connecting pieces of a respective pair, and the system may further include a purge piece between the fluid connecting pieces of the respective pair, having at least two ports, one of which is connected to the manifold piece.

The system may further include a locator end piece holding and aligning one of the fluid connecting components and being smaller than the locator alignment components.

The invention also provides a fluid delivery system, including a mounting structure, at least three locator components secured to the mounting structure, at least three pairs of fluid connecting pieces, each having inlet and outlet ports and a fluid communication passage interconnecting the ports, each respective pair being releasably held and aligned by a respective one of the locator pieces, and a plurality of manifold pieces having a manifold passage having a center line crossing over a line interconnecting the two farthest ports of the fluid connecting pieces and being removable without removing any of the three locator components.

BRIEF DESCRIPTION OF THE DRAWINGS

The invention is further described by way of example with reference to the accompanying drawings, wherein:

FIG. 2 is a perspective view of one of many locator alignment cradles forming part of the system;

FIG. 3 is a perspective view of one of many fluid connecting blocks forming part of the system;

FIG. 5 is a perspective view of a fluid T-piece forming part of the system;

FIG. 6 is a perspective view of a purge piece forming part of the system;

FIG. 7 is a perspective view of a locator end piece forming part of the system;

FIG. 8 is a perspective view of a fluid T-piece that may be used instead of the T-piece of FIG. 5;

FIG. 9 is a perspective view of another fluid T-piece that may be used instead of the fluid T-piece of FIG. 5;

FIG. 10 is a perspective view of a purge piece that may be used instead of the purge piece of FIG. 6;

FIG. 11 is a perspective view of a flange piece forming part of the system;

FIG. 12 is a perspective view of a flange component that may be used together with the flange piece of FIG. 11;

FIG. 13 is a perspective view of an elbow piece that can be used at an end of a row of fluid connecting blocks;

FIG. 14 is a perspective view of an elbow piece that may be used instead of the elbow piece of FIG. 13;

FIG. 15 is a perspective view of an elbow piece that may be used instead of the elbow piece of FIG. 13;

DETAILED DESCRIPTION OF THE INVENTION

Figure 1:
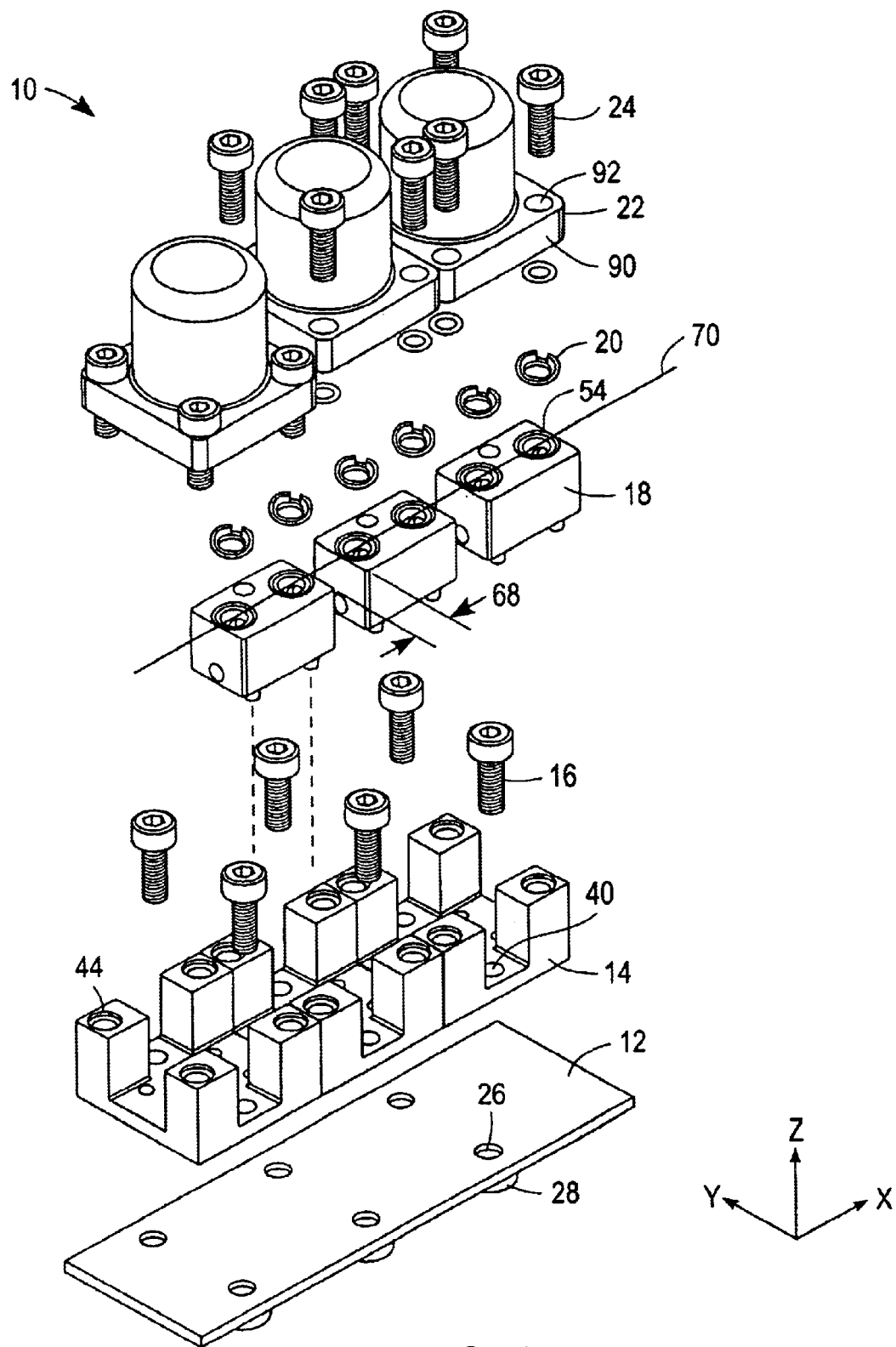
FIG. 1 is a perspective view of one row of components of a fluid delivery system, according to an embodiment of the invention.

FIG. 1 of the accompanying drawings illustrates one row of a fluid delivery, or gas manifold, system 10 according to an embodiment of the invention, including a base mounting plate 12, three locator alignment cradles 14, six locator fastener screws 16, three fluid connecting blocks 18, six seals 20, three fluid control components 22, and twelve component fastener screws 24.

The base mounting plate 12 has six cradle mounting openings 26 formed therein. Six nuts 28 are welded to a bottom surface of base mounting plate 12. Each nut 28 has a threaded hole which is aligned with a respective one of the cradle mounting openings 26.

Referring to FIG. 2, each locator alignment cradle 14 has a base portion 30 and four securing and alignment pillars 32. The alignment pillars 32 extend upward from four corners of the base portion by a distance 34, are spaced from one another in an x-direction by a distance 36, and in a y-direction by a distance 38. Two base plate mounting openings 40 are formed in the base portion 30. Six connecting block alignment openings 42 are also formed in the base portion 30. A respective threaded component mounting opening 44 is formed into an upper surface of each respective alignment pillar 32.

Referring again to FIG. 1, the locator alignment cradles 14 are positioned in a row extending in an x-direction on the base mounting plate 12, with each base plate mounting opening 40 aligned with a respective one of the cradle mounting openings 26.

A respective one of the locator fastener screws 16 is subsequently inserted into each respective one of the base plate mounting openings 40, a cradle mounting opening 26, and then is screwed into one of the nuts 28. The locator alignment cradles 14 are thereby secured to the base mounting plate 12. Although there should be little need to remove the locator alignment cradles 14 for maintenance purposes, the locator alignment cradles 14 can still be removed by undoing the locator fastener screws 16, for example for purposes of removing some of the locator alignment cradles 14 or rearranging the locator alignment cradles 14 in a modular fashion.

Referring to FIG. 3, one of the fluid connecting blocks 18 has a height 48 in a z-direction, a length 50 in an x-direction, and a width 52 in a y-direction. Inlet and outlet ports 54 are formed in an upper surface 56 of the fluid connecting block 18. A passage 60 is drilled into an end surface 62 and interconnects lower portions of the ports 54. The passage 60 is closed off at the surface 62. A fluid connecting passage is thereby jointly defined by lower portions of openings forming the ports 54 and the passage 60. A gas can thus flow into one of the ports 54, through the fluid connecting block 18, and exit through the other port 54. Four cradle alignment pins 64 stand proud of a lower surface of the fluid connecting block 18.

Referring again to FIG. 1, the fluid connecting blocks 18 are inserted into the locator alignment cradles 14. The fluid connecting block 18 to the left has a left portion which is located on the locator alignment cradle 14 to the left, and a right portion which is located on the locator alignment cradle 14 in the middle. The fluid connecting block 18 in the middle is held jointly by the locator alignment cradles 14 in the middle and to the right. The width (52 in FIG. 3) of each fluid connecting block 18 matches the distance in a y-direction (38 in FIG. 2) and defined by the locator alignment cradles 14 so that the fluid connecting blocks 18 are prevented from movement in a y-direction and in ⊖ in an x-y plane about a z-axis. The cradle alignment pins (64 in FIG. 3) also engage with the connecting block alignment openings (42 in FIG. 2) to further prevent movement of the fluid connecting blocks 18 in a y-direction and in ⊖. Interengagement of the cradle alignment pins 64 with the connecting block alignment openings 42 also prevent sliding of the fluid connecting blocks 18 in an x-direction relatively toward or away from one another, so that a gap 68 is maintained between adjacent ones of the fluid connecting blocks 18. The fluid connecting blocks 18 are thus positioned relative to one another with their ports aligned in a row 70 extending in an x-direction and with gaps 68 defined between them.

Figure 4:
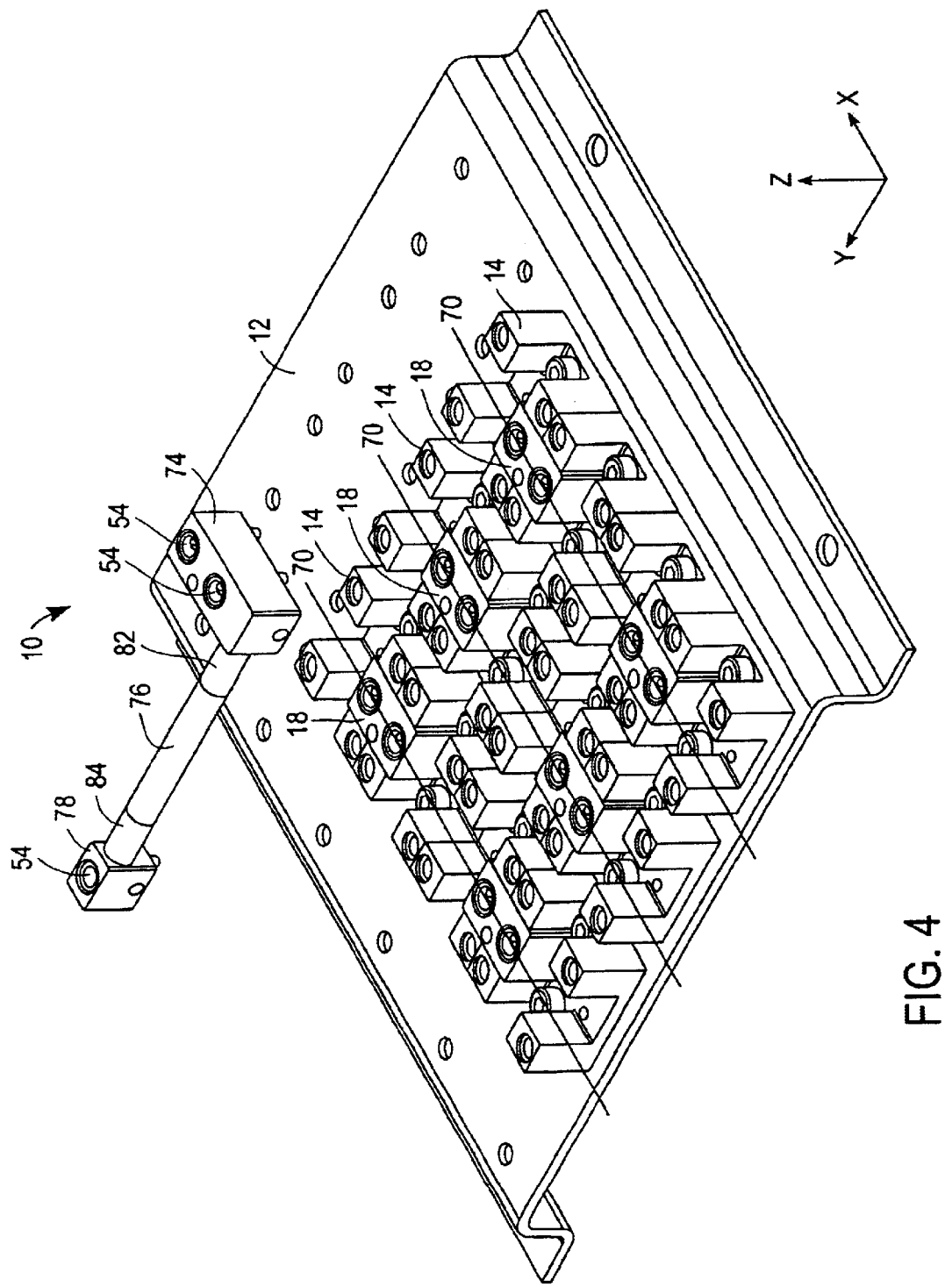
FIG. 4 is a perspective view of additional components of the system that are used to interconnect rows extending in an x-direction to one another in a y-direction.

FIG. 4 illustrates additional components of the fluid delivery system 10, including additional locator alignment cradles 14 and additional fluid connecting blocks 18. The additional locator alignment cradles 14 and fluid connecting blocks 18 are mounted, as illustrated in FIG. 1, in rows that extend in an x-direction but are located adjacent one another in a y-direction.

The fluid delivery system 10 further includes a fluid T-piece 74, a manifold piece 76, and a purge piece 78.

Referring to FIG. 5, the fluid T-piece 74 has a length 80 in an x-direction which equals the length 50 of the fluid connecting block 18 in FIG. 3 plus the length of the gap 68 in FIG. 1. In addition to inlet and outlet ports 54, the fluid T-piece 74 also has a third port 82 extending in a y-direction. The third port 82 is in flow communication with both of the inlet and outlet ports 54 of the fluid T-piece 74. Gases can, for example, flow in a downward z-direction into the inlet and outlet ports 54, be combined within the fluid T-piece 74, and flow in a y-direction out of the third port 82.

Referring again to FIG. 4, the manifold piece 76 is connected to the third port 82 and extends in a y-direction away from the fluid T-piece 74. Referring to FIG. 6, the purge piece 78 has one port 54 in an upper surface thereof, and an additional port 84 extending therefrom in a y-direction. The ports 54 and 84 of the purge piece 78 are in flow communication with one another, so that a gas can, for example, flow in a y-direction into the additional port 84 and leave in a z-direction out of the port 54 of the purge piece 78. The purge piece 78 has a width 88 that substantially equals the gap 68 in FIG. 1. Referring again to FIG. 4, the additional port 84 of the purge piece 78 is connected to the manifold piece 76.

The fluid T-piece 74, together with the manifold piece 76 and the purge piece 78, can be inserted downward into the locator alignment cradles 14. The fluid T-piece 74 fits on two of the cradles 14 in the same manner as one of the fluid connecting blocks 18, except that the fluid T-piece 74 extends further to the left over its cradle 14 than one of the fluid connecting blocks 18. The manifold piece 76 extends through the gaps (68 in FIG. 1). The manifold piece 76 has a center line that, when viewed from the top, crosses over a center one of the rows 70. The purge piece 78 is inserted into a gap between two of the fluid connecting blocks 18. The inlet and outlet ports 54 of the fluid T-piece 74 are located in one of the rows 70, and the port 54 of the purge piece 78 is located in another one of the rows 70.

Referring again to FIG. 1, a seal 20 is located on each one of the ports 54, whereafter the fluid control components 22 are positioned over the fluid connecting blocks 18. Each fluid control component 22 has a respective flange 90 with four cradle mounting openings 92 therein. The cradle mounting openings 92 of each component 22 are located over the component mounting openings 44 of a respective locator alignment cradle 14. A respective component fastener screw 24 is inserted through a respective cradle mounting opening 92 and screwed into a component mounting opening 44 to secure the respective fluid control component 22 to the respective locator alignment cradle 14 and compress two of the seals 20. As with the locator alignment cradles 14, the fluid control components 22 are located in a row. Adjacent ones of the fluid control components 22 are in flow communication with one another through a respective one of the fluid connecting blocks. It can thus be seen that the fluid control components 22 located in a row extending in an x-direction can be placed in flow communication with one another utilizing the components illustrated in FIG. 1. Referring again to FIG. 4, the fluid T-piece 74, the manifold piece 76, and the purge piece 78 can be used to place fluid control components that are in different rows spaced from one another in a y-direction in flow communication with one another.

An advantage of the invention is that the fluid delivery system 10 is easily maintained. The manifold piece 76 can, for example, be replaced by simply removing any fluid control pieces located over the manifold piece 76 and then lifting the manifold piece 76 together with the fluid T-piece 74 and the purge piece 78 out of the locator alignment cradles 14. There is thus no need to remove any of the locator alignment cradles 14 or any of the fluid connecting blocks 18 in order to replace the manifold piece 76, even though a center line of the manifold piece 76 crosses over one of the rows 70.

Figure 16:
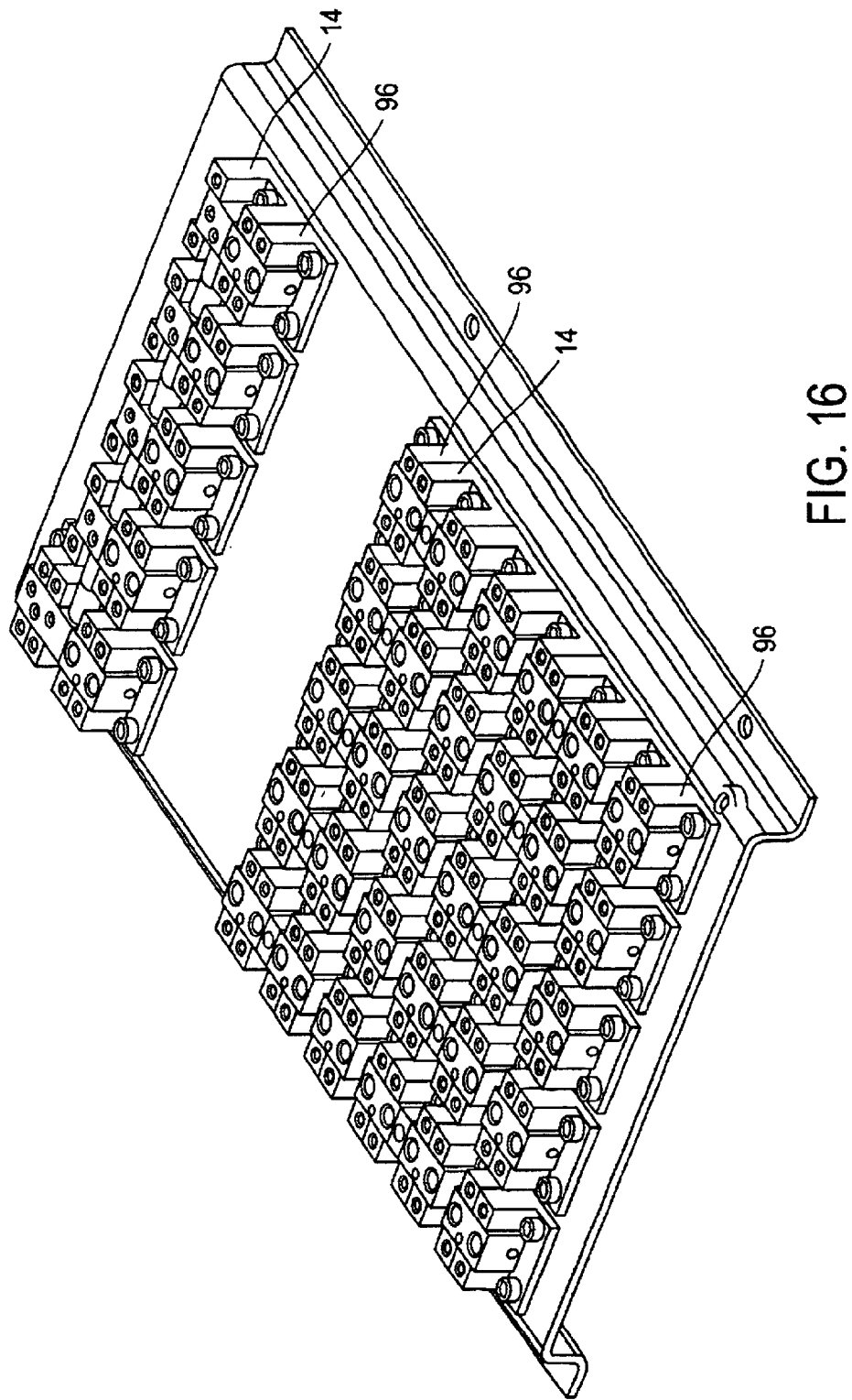
FIG. 16 is a perspective view of further components of the system, particularly illustrating the positioning of the locator end pieces of FIG. 7.

FIGS. 7 through 15 illustrate further components that may be used for constructing the fluid delivery system 10 and are presented for purposes of completeness. FIG. 7 illustrates a locator end piece 96 having only two pillars 98. The locator end piece 96 has a length 100 in an x-direction which is less than a length 102 of the locator alignment cradle 14 in an x-direction. As illustrated in FIG. 16, the locator end pieces 96 may, for example, be used adjacent ends of a row of locator alignment cradles 14, but do not have the additional pillars of the locator alignment cradles 14 in order to save space in an x-direction.

FIG. 9 illustrates a fluid T-piece 106 which is the same as the fluid T-piece 74 of FIG. 5, except that a third port 108 thereof extends in an opposite direction than the third port 82. FIG. 8 illustrates a fluid T-piece 110 which is the same as the fluid T-piece 74 of FIG. 5, except that the fluid T-piece 110 has third and fourth ports 112 and 114 extending in opposite directions. The combination of the fluid T-pieces of FIGS. 5, 8, and 9 allow for a modular design wherein gas can be directed up, down, or in both directions on a y-axis.

FIG. 10 illustrates a purge piece 120 which is the same as the purge piece 78 of FIG. 6 except that, in addition to the ports 54 and 84 of the purge piece 78 of FIG. 6, an additional port 116 is provided, which extends in an opposite direction as the port 84. The purge piece 120 thus allows for flow both upward and downward thereof on a y-axis.

FIG. 11 illustrates a flange piece 122 that can be used for changing flow between a z-direction and an x-direction, and would typically be located at an end of a row. FIG. 12 illustrates a flange connection 124 that may be used in combination with the flange connection piece 122 of FIG. 11 to direct flow in an x-direction, for example for purposes of connection to an external source of gas.

FIGS. 13 to 15 illustrate elbow pieces 130, 132, and 134 respectively. The elbow pieces 130, 132, and 134 are typically located at an end of a particular row. Each elbow piece 130, 132, and 134 has a single port 54 in an upper surface thereof, so that flow in an x-direction is terminated. Ports 136 allow for flow in a y-direction into or out of the elbow pieces 130, 132, or 134.

Figure 17:
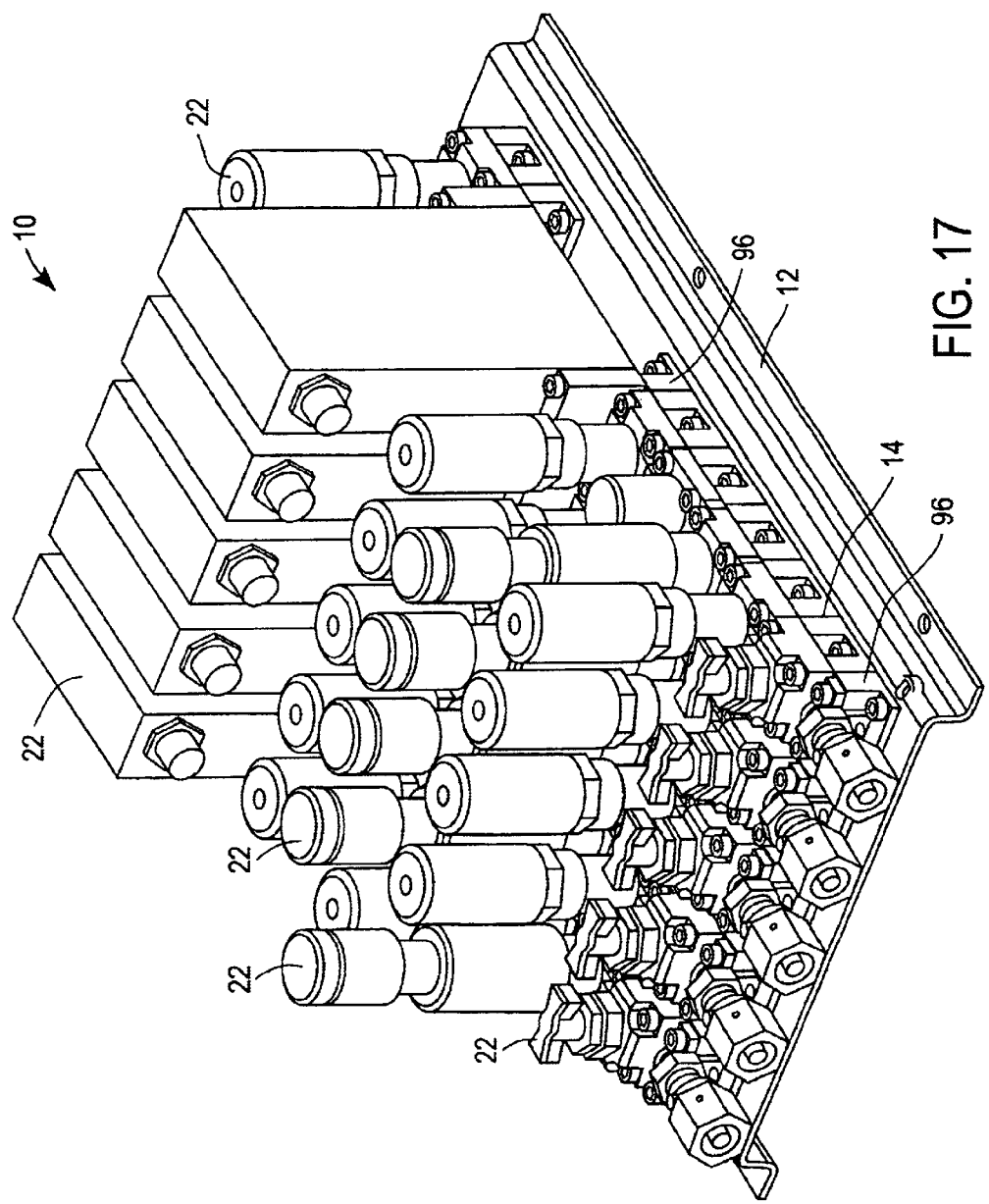
FIG. 17 is a perspective view of the system as fully assembled.

FIGS. 16 and 17 illustrate final assembly of the fluid delivery system 10. When fully assembled, as shown in FIG. 17, the fluid delivery system 10 includes various flow fluid control components 22 connected to one another in an x- and y-array, including regulators, mass flow controllers, filters, and pressure transducers.

Other embodiments of the invention may also be used to flow fluids other than gases, such as liquids. The components of the fluid delivery system may be sized and shaped differently to accommodate different designs of fluid control components utilizing different sealing interfaces. A complete fluid delivery system need not include the manifold pieces and comprise a row of locator alignment cradles, fluid connecting pieces, and fluid control components.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A fluid delivery system, including a mounting structure, a plurality of rows of locator alignment components secured to the mounting structure, a plurality of rows of fluid connecting pieces, each having inlet and outlet ports and a fluid communication passage interconnecting the ports, the fluid connecting pieces being arranged in pairs, each pair including two of the fluid connecting pieces located next to one another in a respective row of fluid connecting components, the fluid connecting pieces of each pair being releasably held by and aligned relative to one another by a respective one of the locator alignment components, and a plurality of manifold pieces extending transverse to the rows of fluid connecting pieces, at least one manifold piece having a manifold passage with a center line crossing over a center line interconnecting the farthest ports of one of the pairs and being removable without removing the locator alignment component by which the respective pair is held from the mounting structure.

2. A fluid delivery system according to claim 1, wherein the locator alignment components are arranged in sets, each set including two of the locator alignment components next to one another in a respective row of locator alignment components, and each fluid connecting piece being held by both locator alignment components in a respective set.

3. A fluid delivery system according to claim 1, wherein a gap is defined between fluid connecting pieces of a respective pair, the manifold piece being removable out of the gap without removal of the pair from the locator alignment component holding the pair.

4. A fluid delivery system according to claim 1, which includes a plurality of locator alignment fasteners removably fastening the locator alignment pieces to the mounting structure.

5. A fluid delivery system according to claim 1, wherein the fluid alignment components are cradles.

6. A fluid delivery system according to claim 5, each cradle preventing movement of the fluid connecting pieces of a respective pair in x, y, and $\ominus$.

7. A fluid delivery system according to claim 1, which includes a plurality of fluid control components placed in flow communication with one another through the fluid communication passages and the manifold passages.

8. A fluid delivery system according to claim 7, wherein one of the fluid control components has an inlet passage connected to an outlet port of one of the connecting pieces of a pair, and an outlet passage connected to an inlet port of another one of the connecting pieces of the respective pair.

9. A fluid delivery system according to claim 7, wherein the fluid control components may include at least one of a valve, a regulator, a mass flow controller, a filter, and a pressure transducer.

10. A fluid delivery system according to claim 1, wherein the ports of each respective fluid connecting piece may be located into the same side of the respective fluid connecting piece.

11. A fluid delivery system according to claim 1, which includes at least one fluid T-piece having at least three ports and at least one fluid communication passage interconnecting all three ports, the T-piece being releasably held and aligned relative to one of the locator alignment components, one of the ports of the fluid T-piece being connected to the manifold piece.

12. A fluid delivery system according to claim 1, which includes at least one fluid elbow piece having at least two ports and at least one fluid communication passage interconnecting both ports, the elbow piece being releasably held and aligned relative to one of the locator alignment components, one of the ports of the fluid elbow piece being connected to the manifold piece.

13. A fluid delivery system according to claim 1, wherein a gap is defined between the fluid connecting pieces of a respective pair, and the system further includes a purge piece between the fluid connecting pieces of the respective pair, having at least two ports, one of which is connected to the manifold piece.

14. A fluid delivery system according to claim 1, which includes a locator end piece holding and aligning one of the fluid connecting components and being smaller than the locator alignment components.

15. A fluid delivery system, including a mounting structure, at least three locator components secured to the mounting structure, at least three pairs of fluid connecting pieces, each having inlet and outlet ports and a fluid communication passage interconnecting the ports, each respective pair being releasably held and aligned by a respective one of the locator pieces, and a plurality of manifold pieces, each having a manifold passage having a center line crossing over a line interconnecting the two farthest ports of the fluid connecting pieces and being removable without removing any of the three locator components.

* * * * *